L. DAVIS.
Harrow and Corn Marker.

No. 195,991. Patented Oct. 9, 1877.

WITNESSES
Robert Ewitt
James Sheehy

INVENTOR.
Levi Davis.
Gilmore, Smith & Co.
ATTORNEYS.

UNITED STATES PATENT OFFICE.

LEVI DAVIS, OF WILMINGTON, KANSAS.

IMPROVEMENT IN HARROW AND CORN-MARKER.

Specification forming part of Letters Patent No. 195,991, dated October 9, 1877; application filed July 21, 1877.

*To all whom it may concern:*

Be it known that I, LEVI DAVIS, of Wilmington, in the county of Osage and State of Kansas, have invented a new and valuable Improvement in Harrows and Corn-Markers; and I do hereby declare that the following is a full, clear, and exact description of the construction and operation of the same, reference being had to the annexed drawings, making a part of this specification, and to the letters and figures of reference marked thereon.

Figure 1:
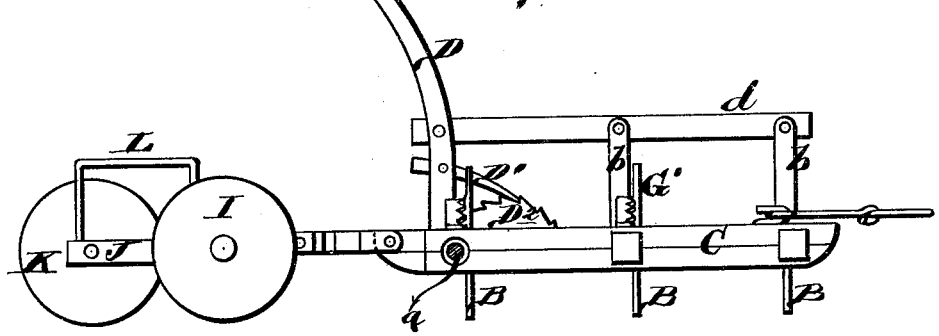
Figure 2:
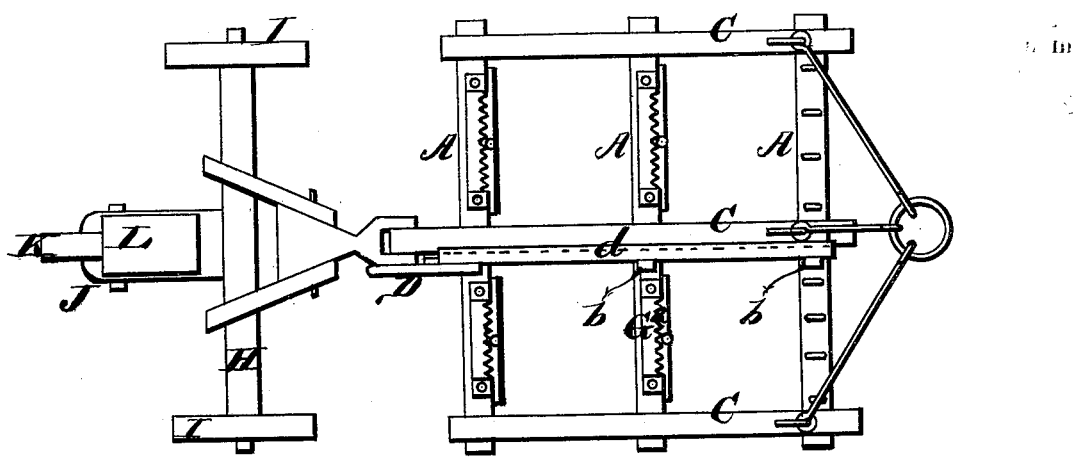
Figure 3:
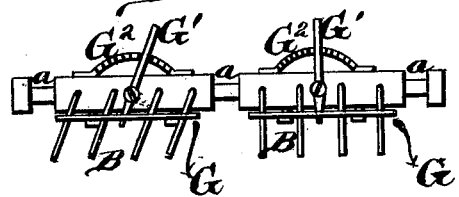

Figure 1 of the drawings is a representation of a side view of my harrow and corn-marker. Fig. 2 is a plan view, and Fig. 3 is a detail of the same.

The nature of my invention consists in the construction and arrangement of a harrow, as will be hereinafter more fully set forth and claimed.

The annexed drawing, to which reference is made, fully illustrates my invention.

The frame of my harrow is composed of a series of parallel bars, A A, to which the teeth B are connected, said bars being formed in the center and near each end with rounded portions $a$, and connected by means of double bars C fitting over said rounded portions, one in the center and one near each end.

Each bar C is made in two parts, with notches to form, when put together, holes or bearings for the rounded portions $a$ of the bars A; but said holes or bearings are made considerably larger than said rounded parts $a$, so that when the frame is put together it is in a certain degree flexible or very loose-jointed, which allows the harrow to adapt itself to any inequalities in the ground.

At the same time the bars A are capable of being turned in their bearings in the double bars C.

The bars A are provided near their centers with arms $b$, connected by a bar, $d$, and this bar connected to a lever, D, which is pivoted to the rear end of the center bar C. To this lever is pivoted a pawl, $D^1$, which takes into a rack, $D^2$, to hold the bars A with the teeth B at any angle desired, forward or backward.

On each bar A the teeth B are arranged in two series, one on each side of the center bar C. The upper ends of all the teeth B are bent at right angles, and pivoted in the front sides of the bars A. The teeth of each series pass through a plate, G, arranged to slide on the under side of the bar A, and said slide is operated by a lever, $G^1$, taking into a rack, $G^2$, to throw the teeth and hold them at any angle laterally that may be desired.

It will thus be seen that the teeth have a twofold adjustment, viz., back and forth, and to either side, so that the harrow can be set for any kind of ground and any kind of work desired to be done.

To the rear end of the center-bar C is coupled an axle, H, carrying at each end a wheel, I, and from the center of said axle projects rearward a forked arm, J, carrying a wheel, K, and over the same is arranged the driver's seat L.

The wheels I K I, being a suitable distance apart, form the markers for marking the rows of corn to be planted by the planter following behind the harrow.

What I claim as new, and desire to secure by Letters Patent, is—

1. A harrow the teeth of which are capable of having backward, forward, and lateral adjustments, and adapted to operate substantially as described, and for the purpose set forth.

2. In a harrow, a series of teeth pivoted upon the transverse bars, and adapted to be adjustable laterally to different angles by mechanism substantially as described.

In testimony that I claim the above I have hereunto subscribed my name in the presence of two witnesses.

LEVI DAVIS.

Witnesses:
 S. D. WRIGHT,
 S. H. NEWMAN.